(12) United States Patent
Hrastnik

(10) Patent No.: US 10,489,024 B2
(45) Date of Patent: Nov. 26, 2019

(54) UI RENDERING BASED ON ADAPTIVE LABEL TEXT INFRASTRUCTURE

(71) Applicant: SAP SE, Walldorf (DE)

(72) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 15/701,742

(22) Filed: Sep. 12, 2017

(65) Prior Publication Data

US 2019/0079649 A1    Mar. 14, 2019

(51) Int. Cl.
| | |
|---|---|
| *G06F 3/0484* | (2013.01) |
| *G06F 17/27* | (2006.01) |
| *G06F 17/22* | (2006.01) |
| *G06F 17/28* | (2006.01) |
| *G06F 3/0482* | (2013.01) |

(52) U.S. Cl.
CPC ........ *G06F 3/0484* (2013.01); *G06F 17/2276* (2013.01); *G06F 17/277* (2013.01); *G06F 17/2735* (2013.01); *G06F 17/2881* (2013.01); *G06F 3/0482* (2013.01); *G06F 17/2785* (2013.01)

(58) Field of Classification Search
CPC . G06F 3/0482; G06F 17/2735; G06F 17/2785
See application file for complete search history.

(56) References Cited

U.S. PATENT DOCUMENTS

| | | | | |
|---|---|---|---|---|
| 6,279,018 | B1* | 8/2001 | Kudrolli | G06F 17/277 715/234 |
| 6,915,304 | B2* | 7/2005 | Krupa | G06F 16/284 707/756 |
| 7,191,393 | B1* | 3/2007 | Chin | G06F 9/454 715/205 |
| 8,977,953 | B1* | 3/2015 | Pierre | G06F 17/2785 715/230 |
| 2002/0156846 | A1* | 10/2002 | Rawat | G06F 17/243 709/203 |
| 2003/0025693 | A1* | 2/2003 | Haley | G06F 9/451 345/418 |
| 2003/0107596 | A1* | 6/2003 | Jameson | G06Q 10/0631 715/762 |
| 2005/0097109 | A1* | 5/2005 | Bitsch | G06F 16/90344 |
| 2006/0253476 | A1* | 11/2006 | Roth | G06F 17/2211 |

(Continued)

*Primary Examiner* — William L Bashore
*Assistant Examiner* — Nathan K Shrewsbury
(74) *Attorney, Agent, or Firm* — Fish & Richardson P.C.

(57) ABSTRACT

An interface for accessing adaptive labeling logic for enriching label texts is instantiated. The adaptive labeling logic is provided at an adaptive labeling text processor. At the interface, a request associated with a view of a UI application is received. Data service metadata associated with the UI view is fetched. The data service metadata includes a plurality of fields and association definitions in relation to the UI view. Label texts mapped to the plurality of fields are determined, where one or more of the label texts are mapped to a field from the fields. Adaptive label texts for the plurality of fields are constructed based on evaluation of the association definitions and the determined label texts. A set of adaptive label texts is associated with a field. An adaptive label text uniquely identifies a corresponding field from the plurality of field within the constructed adaptive label texts.

15 Claims, 11 Drawing Sheets

(56) References Cited

U.S. PATENT DOCUMENTS

| | | | | |
|---|---|---|---|---|
| 2007/0038954 A1* | 2/2007 | Ozaki | ............... | G06F 9/451 |
| | | | | 715/788 |
| 2007/0266420 A1* | 11/2007 | Hawkins | ............... | G06F 21/552 |
| | | | | 726/1 |
| 2009/0063470 A1* | 3/2009 | Peled | ............... | G06F 17/278 |
| 2009/0282012 A1* | 11/2009 | Konig | ............... | G06F 17/278 |
| 2013/0031499 A1* | 1/2013 | Vishnubhatta | ......... | G06Q 10/06 |
| | | | | 715/765 |
| 2013/0124958 A1* | 5/2013 | Mendelovich | ........ | G06F 17/245 |
| | | | | 715/212 |
| 2014/0096019 A1* | 4/2014 | Gowen | ............... | G06F 3/1242 |
| | | | | 715/738 |
| 2014/0193047 A1* | 7/2014 | Grosz | ............... | G06F 3/1242 |
| | | | | 382/118 |
| 2014/0195921 A1* | 7/2014 | Grosz | ............... | G06F 3/1242 |
| | | | | 715/738 |
| 2015/0154541 A1* | 6/2015 | Skaaksrud | ............ | H04W 12/06 |
| | | | | 705/333 |
| 2016/0063770 A1* | 3/2016 | Bowers | ............... | B65C 1/021 |
| | | | | 156/64 |
| 2017/0116295 A1* | 4/2017 | Wan | ............... | G06F 16/254 |

* cited by examiner

UI RENDERING BASED ON ADAPTIVE LABEL TEXT INFRASTRUCTURE

BACKGROUND

Label texts provide important information source of a software application from the perspective of end users. Ambiguous or inadequate label texts require additional training of end users and can result in errors during data processing (e.g. when entering or analyzing captured data). Label texts may be used in multiple domains such as analytical applications, search applications, web applications, etc. Such application may be provided in different languages and may be related to common customers. Label texts have to fit to an exposing user interface (UI) application, with its specific layout and data sources. In this context, the usage of a single fixed reusable label text is not sufficient.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Figure 1:
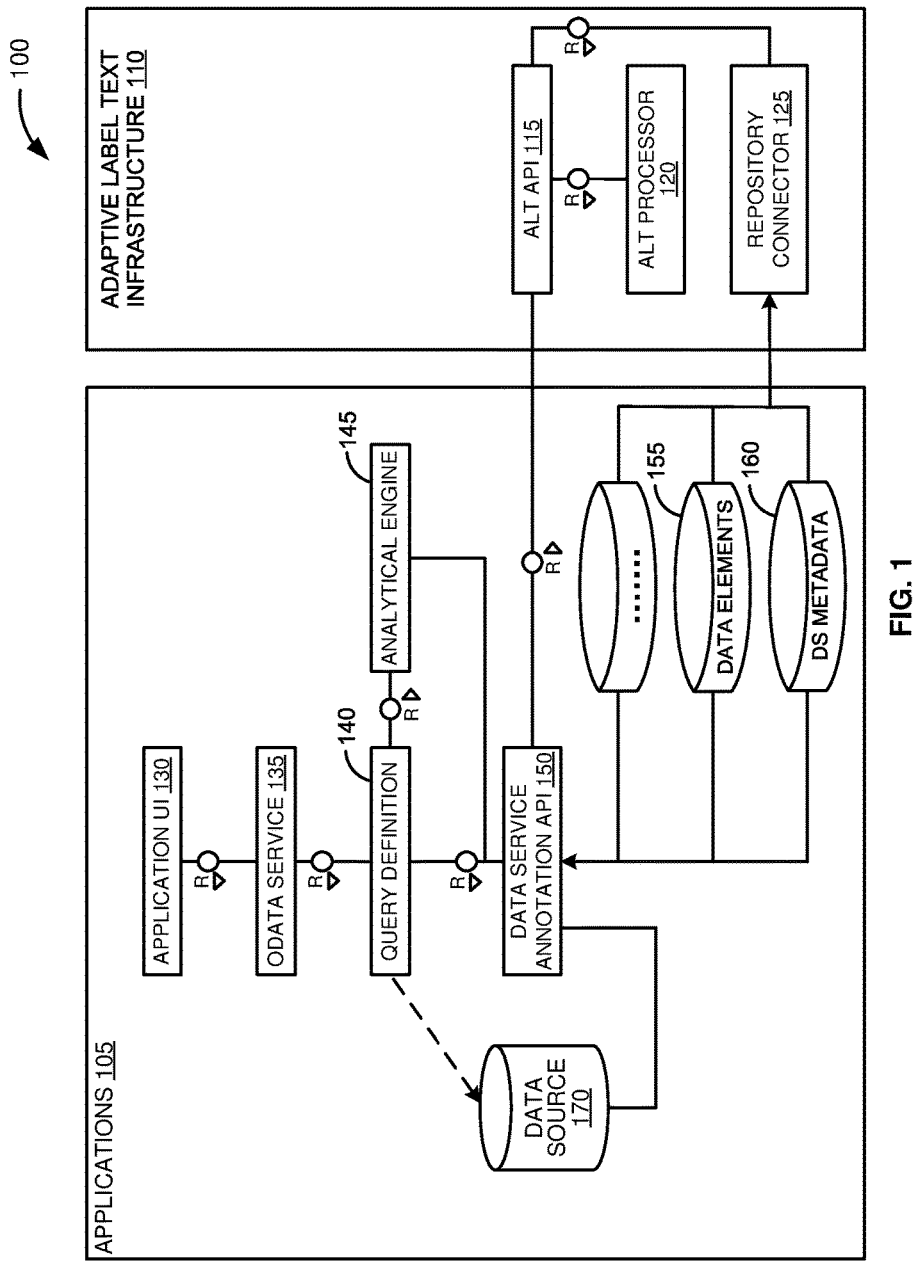
FIG. 1 is a block diagram illustrating an exemplary system for providing adaptive label texts for UI rendering, according to one embodiment.

Embodiments of techniques for UI rendering based on adaptive label text determination are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Software applications are usually built to include a presentation layer (a UI client layer) and a data access layer (a back-end layer). Defined objects at the data access layer may be associated with corresponding data elements, fields, and label texts, that are to be presented at the UI of the application during runtime of the applications. Different label texts may be presented on the UI, depending on the type of data presented, a selected view, preferences, configurations, etc.

In one embodiment, label texts presented on the UI of an application may establish a semantic mapping of data to its purpose or object origin. When designing the UI of an application, it is desirable that the mere label text is defined in such a way that it itself is self-explanatory and makes end users understand the related information without the need to search for additional information sources like functional documentations.

In order not to confuse the end user, the label texts may not vary based on technical reasons, but rather remain the same when presenting the same matter. For instance, the end user may encounter the same label text irrespective of whether it appears next to a form field or as a column caption of a table displayed at the UI of an application. However, it is possible that the available space that is provided for a column caption may be significantly smaller compared to a form field space. Then, the goal of keeping consistent, easy to understand label texts cannot be reached with a single text option for labeling. Instead, to provide a high degree of flexibility, adapting label texts associated with a specific context may be provided according to some embodiments of the invention. Having flexibility to provide meaningful UI labels that are consistent with the UI design concept may be of high value when generating responsive design of software applications. Defining and handling label texts may be associated with high translation costs and many inconsistencies while still lacking the required flexibility and thus hampering the user experience.

FIG. 1 is a block diagram illustrating an exemplary system 100 for providing adaptive label texts for UI rendering, according to one embodiment. Applications 105 include a number of applications, including application UI 130. Applications 105 are associated with defined label texts in data elements associated with fields to be presented on the UIs. In one embodiment, application UI 130 implements UI logic for displaying data associated with data objects stored at a related back-end system. Application UI 130 may be associated with one or more fields to be presented on the UI in different user scenarios. Data element associated with a field may serve as a reusable carrier for textual descriptions having different lengths. The data element may include for example a number of different texts corresponding to a short description label, a short text, a medium text, a long text, a heading text, etc. A different text from the data element may be invoked while generating a UI view on the application UI 130. The text may be selected based on a type of a UI view, based on display properties, based on configuration data, etc.

In one embodiment, application UI 130 may be associated with displaying data received through different scenarios, where data is invoked from related data sources. When providing data on application UI 130, data from data elements 155 may be invoked through a data service annotation API 150. For example, a view to be presented on the application UI 130 may be associated with executing a query based on query criteria. A query definition 140 component may be used for defining a query associated with a data source, such as data source 170. The application UI 130 communicates with the query definition 140 component through an Open Data (OData) Service 135. The OData Service 135 facilitates the consumption of resources generated through invoking a query execution at an analytical engine 145.

In one embodiment, when a query is defined at the query definition 140, the query may be defined in relation to one or more fields from the underlying data source, e.g. data source 140. The results generated based on the query may be provided on the application UI 130. The query definition 140 component may communicate with a data service (DS) annotation application programing interface (API) 150 to provide relevant annotations in the form of label texts associated with the fields to be presented at the application UI 130. The DS annotation API 150 is in connection with data elements 155 storage, with DS metadata 160, and other metadata information, to consume metadata information associated with fields and objects relevant for the defined query.

The analytical engine 145 may be configured to process query definitions and generate results that may be provided on the application UI 130. For example, based on analytical engine 145 execution in relation to a query, analytical results may be generated in the form of a table, which table may be visualized at the Application UI 130. The visualization of the table may be associated with selecting relevant text labels for column from the table that may be determined based on predefined preview configurations.

The DS Annotation API 150 may also communicate with an Adaptive Label Text (ALT) API 115, to determine adaptive label texts for UI rendering in relation to UI views to be presented on the application UI 130. The ALT API 115 is provided as part of an Adaptive Label Text (ALT) infrastructure 110. The ALT infrastructure 110 includes the ALT API 115, which is in communication with an ALT processor 120 and with a repository connector 125 (also part of the ALT infrastructure 110).

In one embodiment, the ALT Processor 120 represents a central engine of the ALT Infrastructure 110. The ALT Processor 120 receives requests through the ALT API 115 that are related to providing label texts for UI rendering in relation to an associated UI view. The ALT Processor 120 includes implemented logic to calculate most appropriate label texts based influencing factors associated with the received request. The calculations performed by the ALT Processor 120, when providing label text based on a request, may be associated with considering additional data related to the received request. For example, the additional data that might be of relevance and considered during performed calculations may be related to data for fully qualifying label texts defined for relevant fields, admissible abbreviation rules, defined abbreviation strategy, visualization parameters associated with font, sizing, style, formatting, etc., available display space, device requirements for rendering text, the overall set of relevant label texts, an existing hierarchical relationship between label texts, etc.

In one embodiment, the ALT Processor 120 may include logic that allows for deriving adaptive abbreviation rules based on a set of interchangeable alternative label texts. For example, if a provided field is associated with determining a relevant label text, such as "Ship To Customer City", an abbreviation rule may be associated with interchangeable abbreviations—"Ship Customer City" (omitting the second word from the label text) or "Ship—City" (omitting the second and third word from the label text). This enables a reuse of existing label text definitions defined for fields, where such label text definitions may be included in data elements, such as data elements 115 storage. These label texts from data elements 115 may automatically be mapped to determined fully qualifying label texts and corresponding abbreviation rules, which are processed by the ALT infrastructure 110.

In one embodiment, the ALT API 115 may provide a set of functions, which support usage of the ALT functionality of the ALT infrastructure 110 in various scenarios. For example, in a scenario where the enrichment of DS annotations, provided by the DS Annotation API 150. The DS annotation may be taken from DS metadata 160 at the applications 105 environment. The DS annotations may be provided from the DS metadata 160 to the ALT API 115 through the DS Annotation API 150. The DS annotations may be enriched to form adapted label texts to be provided to applications from the application 105. In such a scenario, a DS model may be supplied from the DS annotation API 150, whereas the entire determination logic of the enriched label texts is encapsulated in the ALT API 115 implementation. The applications 105 may be integrated with the ALT infrastructure 110 to enable the reuse of the ALT functionality when supporting operation of applications 105. The applications 105 may include applications such as search, analytical and transactional applications.

In some embodiment, the ALT API 115 may be made available for system external consumers as a dedicated OData service.

The ALT API 115 may communicate with the ALT Repository connector 125 when invoking information from DS metadata 160 in relation to a DS model of data related to a request received at the ALT API 115. The Repository connector 125 allows for accessing text repositories including DS label annotations and data element texts as well as related metadata repositories comprising DS model metadata. Therefore, through the Repository connector 125 communication with data elements 115 storage and DS metadata 160 may be performed with regards to stored label annotations, text labels, and metadata related to the applications 105.

Figure 2:
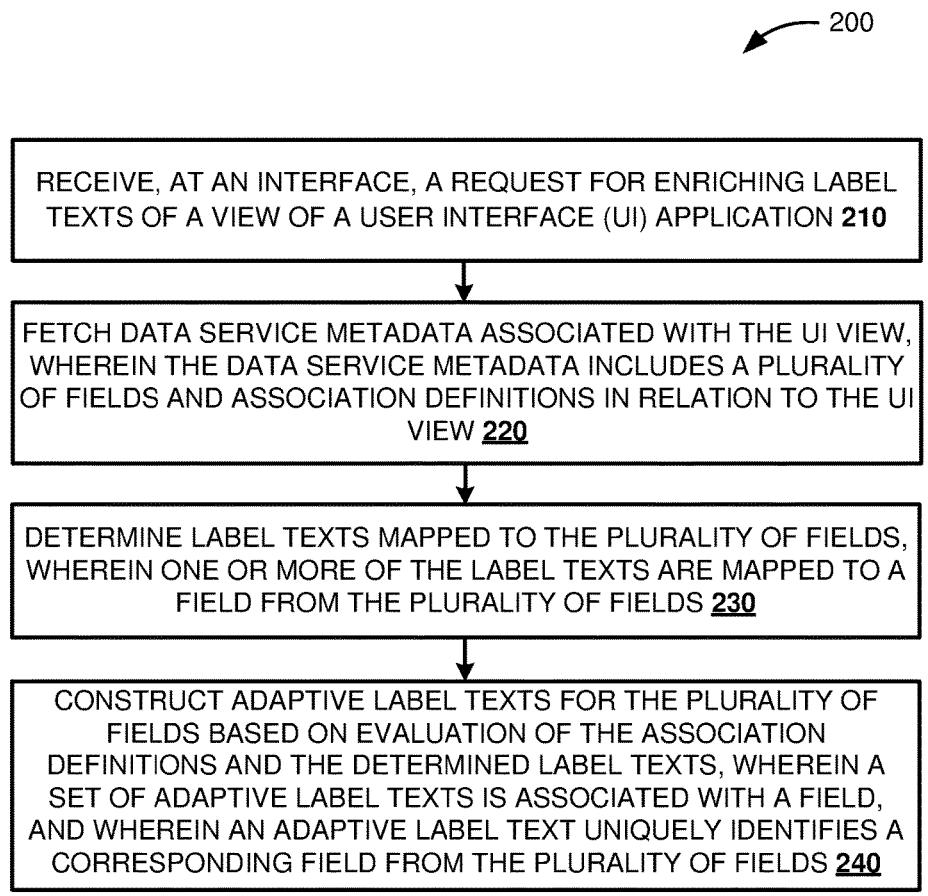
FIG. 2 is a flow diagram illustrating a method for constructing adaptive label texts for UI rendering, according to one embodiment.

FIG. 2 is a block diagram illustrating a method 200 for constructing adaptive label texts for UI rendering, according to one embodiment. The determined adaptive label texts at method 200 may be used for providing meaningful UI labels on the UI with respect to a particular UI view. The UI view may be rendered on the UI to include the adaptive label texts. The constructed adaptive label texts may be selected from a determined set of options for label texts for a particular field. The constructed adaptive label text may be text strings that are distinctive enough to provide accurate information within a rendered UI view. For example, if two fields are associated with labels "City", it may be searched whether these two fields are also associated with other labels, which may allow for distinction between the labels.

At 210, a request for enriching label texts of a view of a UI application is received at an interface. The view may be a UI view and may be generated based on an executed service requesting data result based on query criteria. The request at 210 may be received at an ALT API, such as the ALT API 115.

At 220, data service metadata associated with the UI view is fetched. The metadata may be fetched from data repositories associated with the UI application where data for data fields, labels, associations, and metadata is stored. The fetched metadata includes a plurality of fields and association definitions in relation to the UI view.

At 230, label texts mapped to the plurality of fields are determined. The determining of the label texts is performed through reading the fetched metadata and filtering relevant information in association with the plurality of fields associated with the UI view. At the determined label texts, one or more of the label texts are mapped to a field. For example, a field associated with a billing entity, may be associated with more than one label texts, such as "Bill-to", "Billing Party", "Bill-To Party", etc.

At 240, adaptive label texts are constructed for the plurality of fields based on evaluation of the association definitions and the determined label texts. A set of adaptive label texts is associated with a field from the plurality. The construction of the adaptive label texts is performed to define a unique identification between an adaptive label text and a corresponding field from the plurality of fields.

Figure 3:
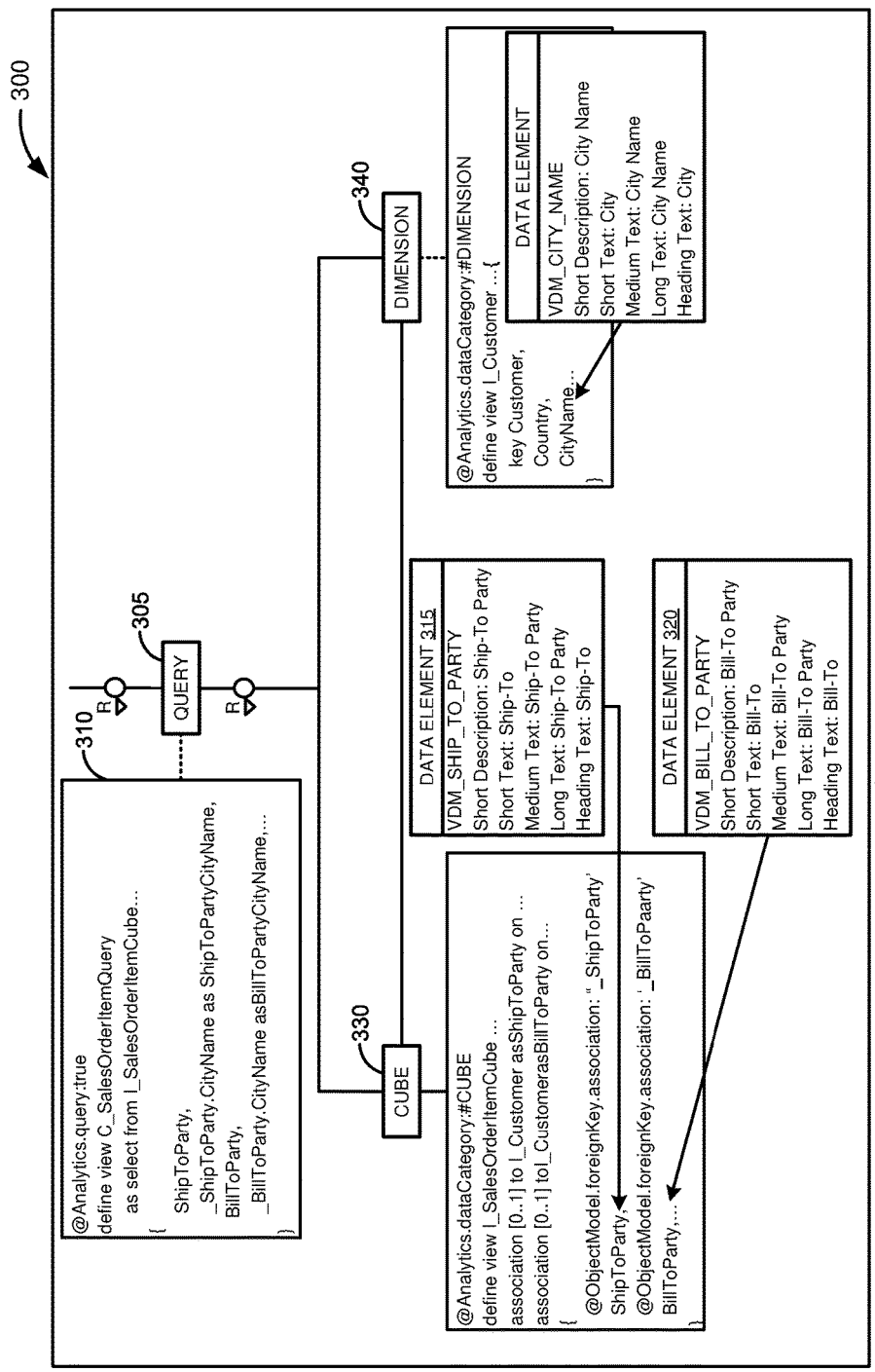
FIG. 3 is a block diagram illustrating an exemplary data service model of an analytical query, according to one embodiment.

FIG. 3 is a block diagram illustrating an exemplary data service model 300 of an analytical query, according to one embodiment.

In one embodiment, a query 305 may be defined as an analytical query. The query 305 may be defined in a query definition component, such as the query definition component 140 in FIG. 1. A definition of the query 305 may be a definition of a view 310. The view 310 is associated with a query view comprising fields of an underlying data source, for example a cube 330, where the cube 330 is associated with assigned dimensions 340. Relevant fields defined in the cube 330 view and the dimension 340 view are associated with data elements comprising label texts. For example data element 315 and data element 320 are related to fields ShipToParty and BillToParty, defined in the cube 330 and also associated with the query 305. Data element 315 includes a set of label texts for the field ShipToParty, such as short description label, short text label, medium text label, long text label, and heading label. Such labels defined in the data element 315 may be used when presenting data invoked from the cube 330 in relation to that field, where a different label may be selected based on a presentation scenario. For example, data related to a filed may be presented as part of a table column, or party of a display box, or a drop down menu, etc. Different visualization parameters may be associated with the UI rendering that may also reflect the selection of a label text from the set at the data element 315.

In the exemplary query 305, view 310 specifies a view "C_SalesOrderItemQuery", which includes the fields ShipToParty and BillToParty of the cube 330 view "I_SalesOrderItemCube". Fields ShipToPartyCityName and BillToPartyCityName are defined as joined fields in the view 310, which originate from associating CityName dimension from the dimension 340 view "I_CustomerView".

For example, data elements associated with fields may be denoted with annotation strings and have a corresponding typing data element as in exemplary Table 1. For example, label texts of the query fields may be defined by their corresponding field typing as defined per data element.

TABLE 1

| Field | Data Element |
|---|---|
| ShipToParty | VDM_SHIP_TO_PARTY |
| ShipToPartyCityName | VDM_CITY_NAME |
| BillToParty | VDM_BILL_TO_PARTY |
| BillToPartyCityName | VDM_CITY_NAME |

The query 305 with the definition 310 may be exposed by an OData service, such as the OData Service 135 (FIG. 1), which is implemented by an analytical engine, such as the analytical engine 145 (FIG. 1). The analytical engine may fetch metadata of query view 310 through communication with a data service annotation API. Thus, a list of label texts per field may be provided as data service annotations. The label texts are derived from the referenced data elements. These label text annotations may be processed by the analytical engine to be associated with label text attributes from the fetched metadata.

In one embodiment, the execution of the query view 310 may be performed in the system environment 100 described in relation to FIG. 1. The analytical engine 145 may process the query 305, communicate with the DS annotation API 150 to access data elements 155 and DS metadata 160, and expose results to the application UI 130 through the OData service 135.

Figure 4:
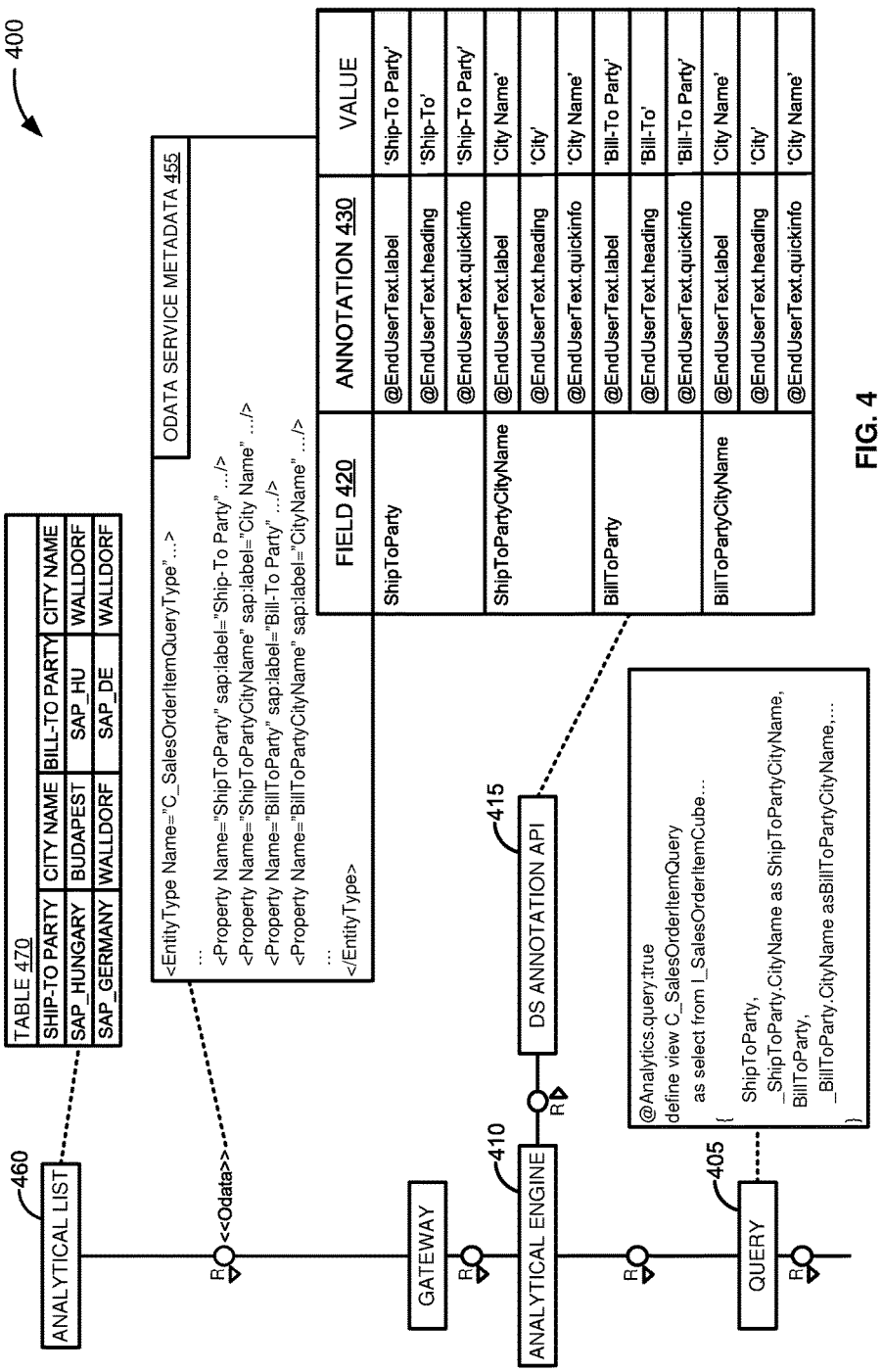
FIG. 4 is a block diagram illustrating an exemplary process for generating an analytical list on a UI application based on stored annotations, according to one embodiment.

FIG. 4 is a block diagram illustrating an exemplary process 400 for generating an analytical list 460 on a UI application based on stored annotations, according to one embodiment. The process 400 may be associated with executing a query such as query 305, of FIG. 3, in an environment, such as system 100, in FIG. 1.

The process 400 includes an analytical list 460 that is provided on a UI of an application as a result of an execution of query 405 through an analytical engine 410. The query 405 may be the same as query 305 of FIG. 3, where a view "C_SalesOrderItemQuery" is defined. The query 405 is associated with fields defined in column field 420. The fields include ShipToParty and BillToParty, and joined fields ShipToPartyCityName and BillToPartyCityName, according to the query definition. The joined fields, ShipToPartyCityName and BillToPartyCityName are referencing the same field CityName defined in a dimension view, such as the dimension 340, in FIG. 3.

The analytical engine 410 may be the same as the analytical engine 145, FIG. 1. The analytical engine 410 is associated with data service annotation API 415, where data for fields 420 and corresponding annotations (as defined in annotation column 430) may be invoked.

In the exemplary process 400, a single label text "sap:label" may be exposed per field to the application UI, where the analytical list is displayed. The exposure of label text may be performed by an OData service, such as the OData service 135. The exposure of label texts is based on the OData service metadata 455. The metadata 455 defined labels for relevant fields associated with the query 405. Based on exposed label texts associated with relevant fields for the query 405, the analytical list is rendered on the UI. Since both joined fields ShipToPartyCityName and Bill- ToPartyCityName are referencing the same field CityName of an associated dimension view, they are typed by the same data element and get the same label texts. The exposed label texts based on the metadata 455 for the 4 fields are "Ship-To Party", "City Name", "Bill-To Party", and "City Name. The exposed labels are presented in table 470, which may be rendered on a UI application in relation to the analytical list 460. This will result in ambiguities in table 470, which presents two columns with the same label texts—"City Name".

Figure 5:
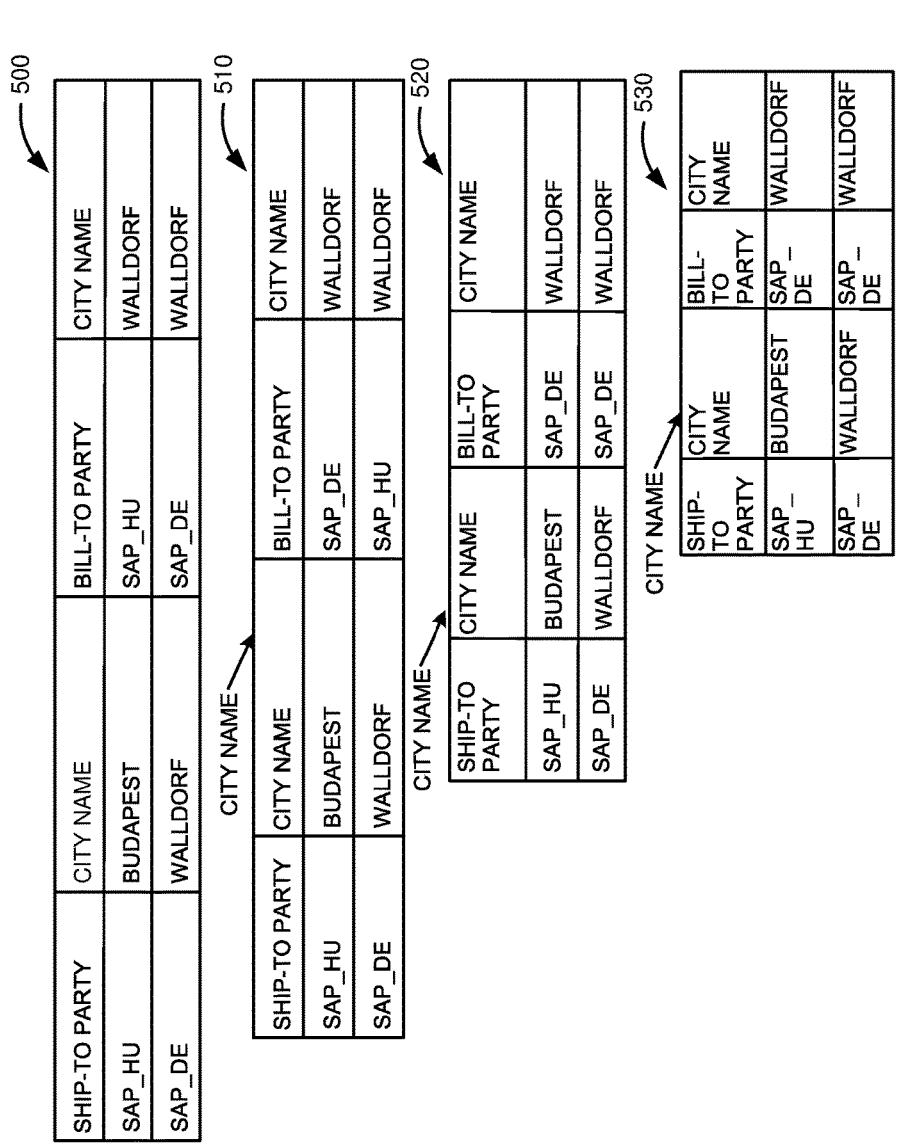
FIG. 5 is a block diagram illustrating examples of UI views generated with different display properties defined for presenting the UI views, according to some embodiments.

FIG. 5 is a block diagram illustrating examples of UI views generated with different display properties defined for presenting the UI views, according to some embodiments. FIG. 5 includes four UI views with different display properties, namely, view 500, view 510, view 520, and view 530. Different column sizing is applied for the UI views 500, 510, 520, and 530. The UI views 500, 510, 520, and 530 are exemplary views rendered on a UI application in relation to presenting table 470, discussed in Table 4.

All label texts rendered on the UI views 500, 510, 520, and 530 are retained even when different sizing criteria for the UI is applied. For example, on UI view 520, the columns are with a smaller width and therefore the label text cannot fit into that width. The label text is kept and just distributed across multiple lines. Also the tooltips presented on the views 500, 510, 520, and 530, display the same label text—"City Name". When information for available suitable label texts is not provided for the UI rendering, such ambiguities with presented UI label texts may appear.

Figure 6:
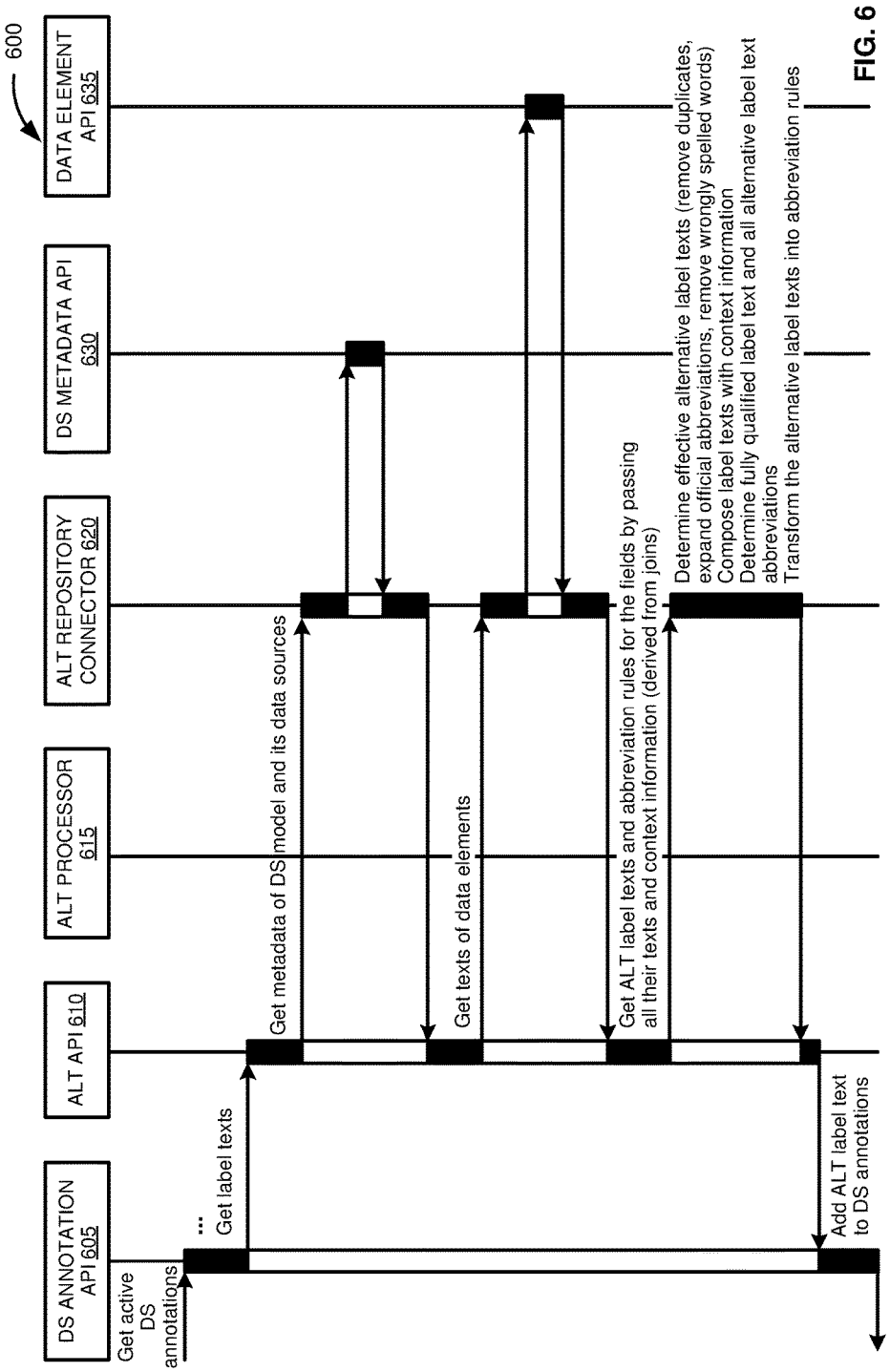
FIG. 6 is a block diagram illustrating a method for constructing adaptive label texts for UI rendering, according to one embodiment.

FIG. 6 is a block diagram illustrating a method 600 for constructing adaptive label texts for UI rendering, according to one embodiment. The method 600 is associated with determining the adaptive label texts by an ALT implemented logic provided by an ALT API 610, such as the ALT API 115, FIG. 1. The ALT implemented logic may be integrated with back-end logic of a UI application, where the rendering of the adaptive label text is provided. The UI application may be such as the application UI 130, FIG. 1. The ALT logic may be implemented at ALT processor 615.

In one embodiment, the ALT logic may be integrated in a DS annotation provider, such as DS annotation API 605. The DS annotation API 605 may be such as the DS annotation API 150, FIG. 1. The DS annotation API 605 may call the ALT API 610 for adding enriched ALT label information to already stored data annotations associated with fields from data at a data source related to the UI application. The DS annotation API 605 may provide the ALT API 610 with a name of a query view for which the adaptive label texts are requested. The ALT API 610 fetches the DS metadata (metadata for fields and association definitions) of the query model of the provided query view. To acquire the metadata, the ALT API 610 calls an ALT repository connector 620, which calls a DS metadata API 630. The ALT repository connector 620 may be such as the repository connector 125, FIG. 1.

The ALT repository connector 620 may be configured to further read the label texts of the used data elements, determined during communication with the DS metadata API 630. The label text may be read based on a communication between the ALT repository connector 620 and data element API 635. The reading of the label texts may be performed from a dictionary relevant for the UI application. The data element API 635 may perform the communication with the dictionary. The dictionary may be a specialized dictionary providing reference of label text specific for the implementation technology of the UI Application and the below back-end implemented logic.

In one embodiment, read label texts of the data elements are converted into alternative label texts when provided to the ALT API 610. The alternative label texts may be automatically derived from the various label texts of the data element by filtering duplicates. Additionally, alternative words within read label texts may be expanded using official abbreviations. All label texts with unknown words may be removed. The longest label text may be preserved if there is otherwise no correctly spelled label text available.

For example, if a request to the ALT API 610 is for enriching label text associated with a query, such as query 305, FIG. 3, and data elements 315 and 320 are read through the DS Metadata API 630, a set of alternative label texts may be determined for the data elements VDM_SHIP_TO_PARTY, VDM_CITY_NAME, AND VDM_BILL_TO_PARTY. For example, the alternative label texts may be such as in Table 2 below.

TABLE 2

| Data Element | Label Text |
| --- | --- |
| VDM_SHIP_TO_PARTY | Ship-To Party |
|  | Ship-To |
| VDM_CITY_NAME | City Name |
|  | City |
| VDM_BILL_TO_PARTY | Bill-To Party |
|  | Bill-To |

Table 2 includes alternative label text information derived from the data elements VDM_SHIP_TO_PARTY, VDM_CITY_NAME, AND VDM_BILL_TO_PARTY. The alternative labels are defined based on evaluation of the defined label texts in the data elements, as described in FIG. 3.

In one embodiment, adaptive label texts of the fields associated with the received request at the ALT API 610 may be constructed based on additional evaluation of the determined alternative label text information and defined join paths within a UI view associated with the request. For example, if the request is associated with a query, joined fields and other fields may be evaluated based on the defined associations in the UI view to construct the adaptive label texts corresponding to all of the fields for the UI view. In the given example in FIG. 3 and Table 2, the field ShipToParty (data element VDM_SHIP_TO_PARTY) is not joined. Therefore, the adaptive label texts for that field are determined to correspond to the typing data element. In contrast, the field ShipToPartyCityName is originating from the field CityName that is incorporated into the query view by the foreign key association from the field ShipToParty. The source field ShipToParty is considered to be a context in which the CityName is defined in. This context is added as a suffix to the adaptive label texts defined for the field CityName. Therefore, an adaptive label text for the field ShipToPartyCityName results may be determined to be "City Name (Ship-To Party)". The determined adaptive label text may be defined as a fully qualifying label text. A fully qualifying label text may be defined as a label including all relevant word strings from typing data elements and association details. Different variations and abbreviations thereof may be defined to form a complete set of adaptive label texts for the field ShipToPartyCityName. Table 3 below illustrates determined adaptive label texts, corresponding abbreviation command, and encoded abbreviation rules for the fields ShipToParty, BillToParty, ShipToPartCityName, BillToPartyCityName, as discussed with the above example in relation to FIG. 3, FIG. 4, Table 1 and 2.

TABLE 3

| Field Name | ALT Label Text | Abbreviation Comment | Encoded Abbreviation Rule |
|---|---|---|---|
| ShipToParty | Ship-To Party | None | |
| | Ship-To | Use the first word, the hyphen and the second word of „Ship-To Party" | 1__2__3 or 1-3 |
| BillToParty | Bill-To Party | None | |
| | Bill-To | Use the first word, the hyphen and the second word of „Bill-To Party" | 1__2__3 or 1-3 |
| ShipToPartyCityName | City Name (Ship-To Party) | None | |
| | City Name (Ship-To) | Use the first two words, the opening bracket, the third word, the hyphen, the forth word and the closing bracket of „City Name (Ship-To Party)" | 1__2__3__4__5__6__8 or 1-6__8 |
| | City (Ship-To) | Use the first word, the opening bracket, the third word, the hyphen, the forth word and the closing bracket of „City Name (Ship-To Party)" | 1__3__4__5__6__8 or 1__3-6__8 |
| | City Name | Use the first two words of „City Name (Ship-To Party)" | 1__2 or 1-2 |
| | City | Use the first 4 letters of „City Name (Ship-To Party)" | 1 |
| BillToPartyCityName | City Name (Bill-To Party) | None | |
| | City Name (Bill-To) | Use the first two words, the opening bracket, the third word, the hyphen, the forth word and the closing bracket of „City Name (Bill-To Party)" | 1__2__3__4__5__6__8 or 1-6__8 |
| | City (Bill-To) | Use the first word, the opening bracket, the third word, the hyphen, the forth word and the closing bracket of „City Name (Bill-To Party)" | 1__3__4__5__6__8 or 1__3-6__8 |
| | City Name | Use the first two words of „City Name (Bill-To Party)" | 1__2 or 1-2 |
| | City | Use the first 4 letters of „City Name (Bill-To Party)" | 1 |

Table 3 includes exemplary transformed ALT label text information for the query view fields in relation to query 305, FIG. 3.

The abbreviation rules of the fully qualifying ALT label text for the individual abbreviations are combined. For example, the whole ALT label information for the query view field ShipToPartyCityName is defined by the fully qualifying label text "City Name (Ship-To Party)" and the abbreviation rule "1-6_811_3-6_811-211". In one embodiment, the encoded abbreviation rules information may technically be further compressed.

Both the fully qualifying label texts as well as the assigned abbreviation rules may be added to the DS annotations stored for the UI application, for example as part of DS metadata, such as the DS metadata 160, which can be accessed through the DS metadata API 630.

Figure 7:
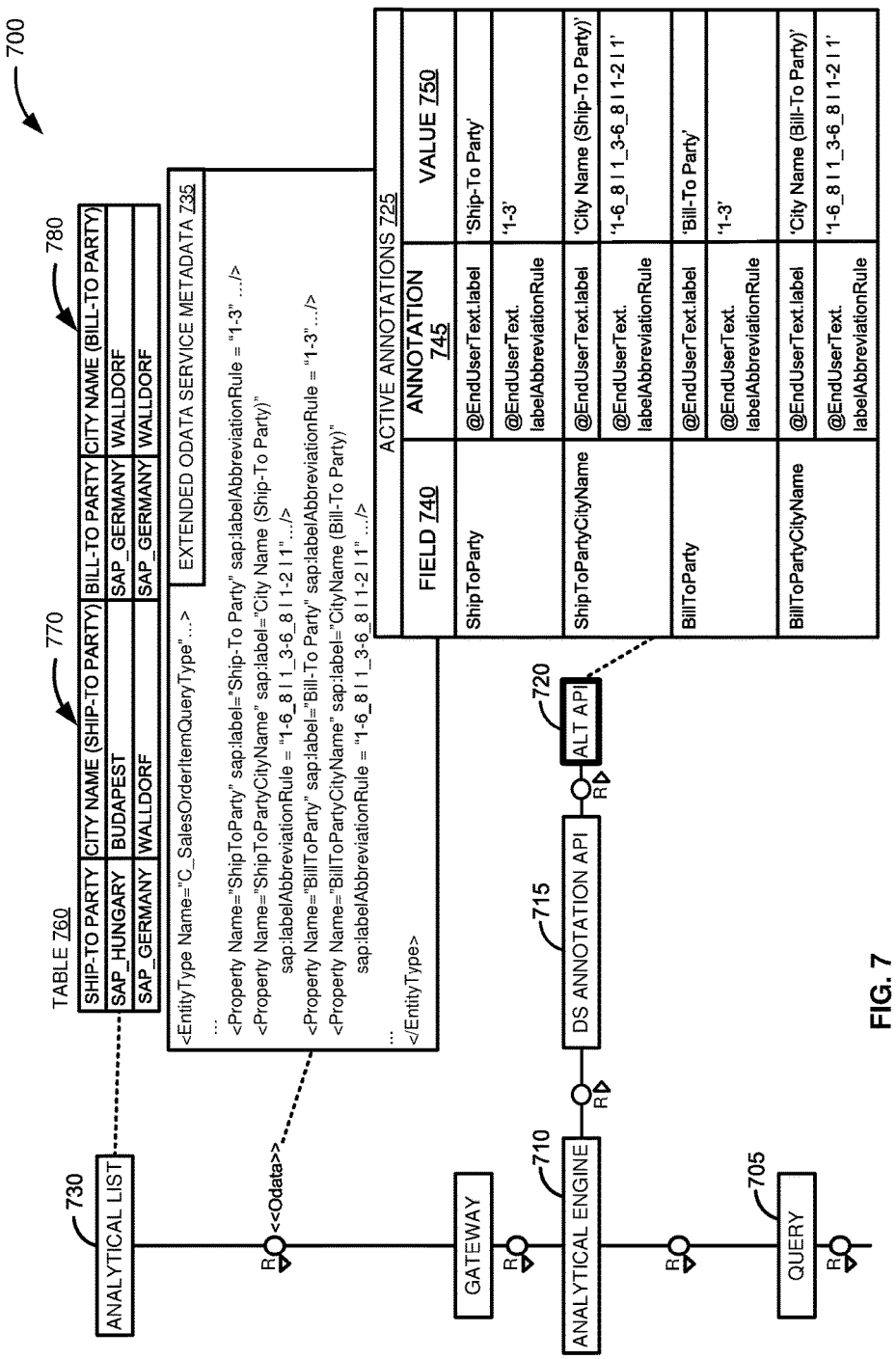
FIG. 7 is a block diagram illustrating an exemplary generation of an analytical list on a UI application based on constructed adaptive label texts for presented fields, according to one embodiment.

FIG. 7 is a block diagram illustrating an exemplary generation 700 of an analytical list on a UI application based on constructed adaptive label texts for presented fields, according to one embodiment. The analytical list 730 may correspond to the analytical list 440, FIG. 4.

According to generation 700 of an analytical list 730, on a UI application a result view may be presented such as Table 760. Table 760 is generated as a result based on a query 705. The query 705 may be such as the query 405, FIG. 4 and query 305, FIG. 3. The query 705 is executed at an analytical engine 710. The analytical engine 710 performs requests to a DS annotation API 715, which requests are associated with fields defined in the query 705. The DS annotation API 715 calls an ALT API 720 with requests for providing enriched adaptive label texts in relation to providing results based on execution of query 705. The ALT API 720 may be such as the one discussed 610 in relation to FIG. 6.

The ALT API 720 may be associated with implemented logic to determine active annotations 725 that may be used when presenting results on the UI application. The active annotations 725 may be defined in the form of a table comprising three columns—field 770, annotation 745, and value 750. The active annotations 725 table may correspond to Table 3, where annotation 745 may define whether the type of label text for a corresponding field is a label or an abbreviation. Within the given exemplary annotations 725, fields 740 and corresponding annotations and values (as in columns annotation 745 and value 750) correspond in part to what is described above in table 3. For example, for one field—"Ship-To Party", which is part of the query 705, 2 types of annotations are determined by the ALT implemented logic—"Ship-To Party" and '1-3' (which is an encoded abbreviation and stands for "Ship-Party"). The ALT API 720 is associated with adaptive label implemented logic to determine these active annotations 725 and provide them to the DS annotation API 715.

In such manner, the analytical list 730 may have access to an enriched set of label text as defined in the active annotations 725. Table 760 is defined to include label text for the column headings based on the active annotations 725 received through the ALT API 720. Table 760 includes columns 770 and 780 to be presented with column headings—"CITY NAME (SHIP-TO PARTY)" and "CITY NAME (BILL-TO PARTY)". These column headings represent label text on the UI, and provide distinct column headings for two columns that are related to a data source field (dimension) "City Name", however the field being associated with different field entities—BillToParty and ShipToParty, when executing the query 705. Therefore, Table 760 includes enriched text labeling to assist visualization. The analytical list 730 including table 760 is generated based on an OData service associated with extended OData service metadata 735. The OData service metadata 735 includes data from the provided active annotations 725 from the ALT API 720. The labeling from Table 760 is determined based on selection of labels from the enriched set of labels, as defined in active annotations 725.

Figure 8:
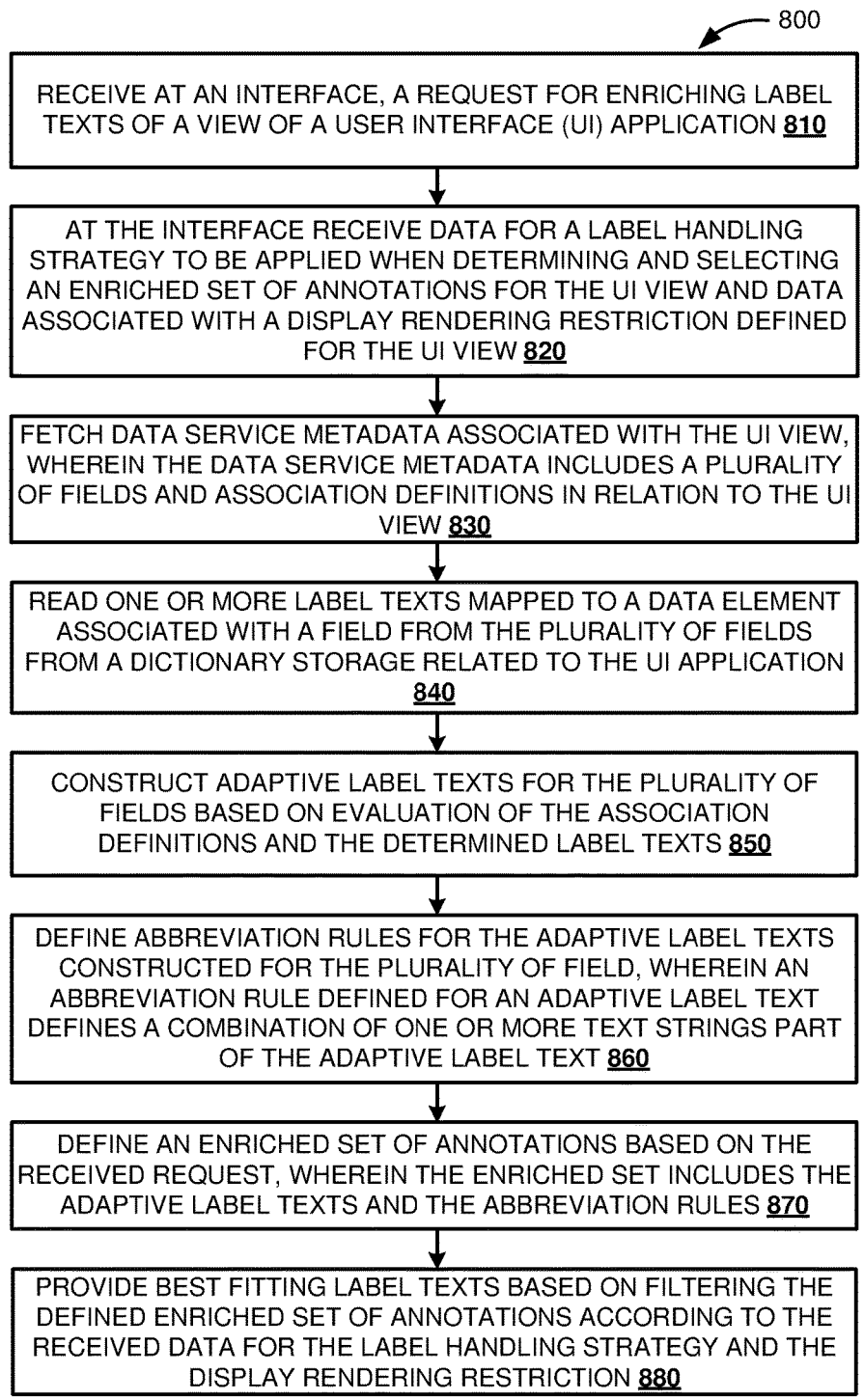
FIG. 8 is a flow diagram illustrating a method for providing best fitted label texts for UI rendering based on adaptive labeling logic associated with label handling strategies and display rendering parameters, according to one embodiment.

FIG. 8 is a flow diagram 800 illustrating a method for providing best fitted label texts for UI rendering based on adaptive labeling logic associated with label handling strategies and display rendering parameters, according to one embodiment.

At 810, at an interface, a request for enriching label texts of a view of a UI application is received. The interface, may be such as an ALT API 720, discussed in relation to FIG. 7, and other embodiments of an ALT API discussed in relation to FIGS. 1, 2, 3, 4, 5, and 6.

At 820, at the interface, data for label handling strategy to be applied when selecting and determining an enriched set of annotations for the UI view is received. At 820, data associated with a display rendering restriction defined for the UI view on the UI application is also received.

For example, table 4 includes description of available defined label handling strategies, which may be applied when determining an appropriate label text to be rendered on a UI application for a particularly requested UI view.

TABLE 4

| Strategy | Explanation | Example |
|---|---|---|
| Unique label texts | Default Strategy. Ensures that the label texts for a given set of fields remain unique. Abbreviations are allowed. | Shorten "City Name (Ship-To)" and "City Name (Bill-To)" but keep a distinction => "Cty (S-T)" and "Cty (B-T)" |
| Label texts without context | Remove parent context information from all label texts. | Remove "Sales Order" from label text "Sales Order Status" => "Status" |
| Fully qualifying label texts only | Use fully qualifying label texts only, i.e. don't use abbreviations of the fully qualifying label text. | "Ship-To Party" remains "Ship-To Party" and cannot be abbreviated to "Party" |
| Label text with unique ID | Add unique ID (a counter) to each label text. | "Ship-To Party" and "Bill-To Party" are converted to "1: Ship-To Party" and "2: Bill-To Party" |
| Keep initials of omitted words | When applying the abbreviation rules the superfluous words are not completely removed but they are replaced by their leading character. | "City Name (Ship-To)" may be shortened to "City N (S-T)" instead of "City" |
| Use xxx letter abbreviations | When applying the abbreviation rules the words are replaced by their xxx letter abbreviations if this still fits to the available space. Otherwise the words are dropped. | "Ship-To Party" may be shortened to "Ship-To Prty" if 4 characters shall be retained. |

At 830, data service metadata associated with the UI view is fetched, for example from a DS metadata storage, through a DS Metadata API, as discussed in relation to DS metadata API 630, in FIG. 6. The data service metadata includes a plurality of fields and association definitions in relation to the UI view.

At 840, one or more label texts mapped to a data element associated with a field from the plurality of fields is read from a dictionary storage related to the UI application 840. For example, for a field, such as the discussed field ShipToParty, 2 label texts may be determined based on communication performed between the interface and a data element API, such as the data element API 635, FIG. 6. The dictionary may be a specialized dictionary storing label text typing options for fields related to the UI application and possible generated views.

At 850, adaptive label texts are constructed for the plurality of fields. The construction is performed based on evaluation of the association definitions and the determined label texts. Exemplary adaptive label texts that may be constructed for field are such as the adaptive label text values defined at the second column on Table 3 above.

At 860, abbreviation rules for the adaptive label texts are defined. Exemplary abbreviation rules for the adaptive label texts may be such as the abbreviation rules defined at the third column on Table 3 above. An abbreviation rule defines a combination of one or more text strings part of a corresponding adaptive label text. The abbreviation rules may be defined on text string level corresponding to meaningful words, or may be defined per character level.

At 870, an enriched set of annotations is defined based on the received request, where the enriched set includes the adaptive label texts and the abbreviation rules. The enriched set of annotations may be also accompanied by abbreviation comments. For example, Table 3 includes an exemplary enriched set of annotations determined for a particular query as discussed above.

At 880, best fitting label texts are provided based on filtering the defined enriched set of annotations according to received data for the label handling strategy and the display rendering restrictions.

In one embodiment, a predefined label handling strategy of the ALT processor may be automatically applied. However, there may be manually implemented applications where the default logic for the label handling strategy may be overruled by selecting another label handling strategy or combination thereof.

A preferred strategy can be configured for an entire application (e.g. in a generic frameworks) and for all control therein. In one embodiment, a local configuration of a strategy may overrule the configuration on an upper (embedding control) level. The ALT strategy may be explicitly provided to the ALT API as an additional import parameter. If not specified explicitly, a default strategy such as "Unique label texts" (Table 4) may be applied. The applicable abbreviation handling strategy may be captured as an additional property of a respective UI control.

Table 5 includes an exemplary set of data associated with fields related to a UI view, and further additional data determined based on accessing ALT logic. The data presented in Table 5 includes data for relevant field (identifier of fields and corresponding parent), determined fully qualifying label texts, data for a label handling strategy, and display rendering parameters.

All label texts rendered on the UI views 900, 910, 920, and 930 are retained even when different sizing criteria for the UI is applied. For example, on UI view 920, the columns are with a smaller width and therefore the label texts as displayed in view 900, and 910, cannot fit into that width. UI view 920 is rendered based on different label text compared to what is provided on view 900 and 910. The label texts for UI view 920 may be selected from provided active annotation by an ALT logic, such as the active annotation 725, FIG. 7. Also the tooltips presented on the views 900, 910, 920, and 930, for the second column, display the same label text—"City Name (Ship-To Party)". When information for available suitable set of label texts for corresponding field is provided for the UI rendering, the presented UI label texts may appear without suggesting ambiguities, as the UI label texts are not overlapping and are distinct from each other.

When changing the layout of the UI, the label texts are calculated anew following a logic for evaluation of determined adaptive label texts for the particular UI view. The layout changes reflect selection of labels based on provided options as in the active annotation 725. As illustrated in the FIG. 9, by default label texts are abbreviated in accordance with the supplied abbreviation rules. In case that the available space is not sufficient for keeping the shortest abbreviated label text, first the non-leading vocals may be removed starting from the last words and finally removing all letters except for the starting letter of each word. If the result set of labels for the presented fields includes ambiguities, the label texts may be prefixed with a figure, e.g. "1:C . . . " and "2:C . . . " for "City Name (Ship-To Party)"

TABLE 5

| ID | Parent ID | Fully Qualifying Text | Abbreviation Rule | Abbreviation Strategy | Max Available Space | Font Size | Font Syle |
|---|---|---|---|---|---|---|---|
| 1 | | Sales Order | 2 | Uniqueness | 200 px | 12 px | Bold |
| 2 | 1 | Sales Order Status | 2-3\|3 | ContextRemoval | 100 px | 10 px | Regular |
| 3 | 1 | Sales Order Customer | 2-3\|3 | FullQualification (inherited) | 100 px | 10 px | Regular |

The ALT processor may calculate a best fitting label texts based on the information, as in Table 5, and may return the calculated results, which are then incorporated in the rendered UI page definition. Table 6 is an exemplary result of the UI page as rendered based on the data in Table 5.

TABLE 6

| ID | Text |
|---|---|
| 1 | Sales Order |
| 2 | Status |
| 3 | Sales Order Customer |

Figure 9:
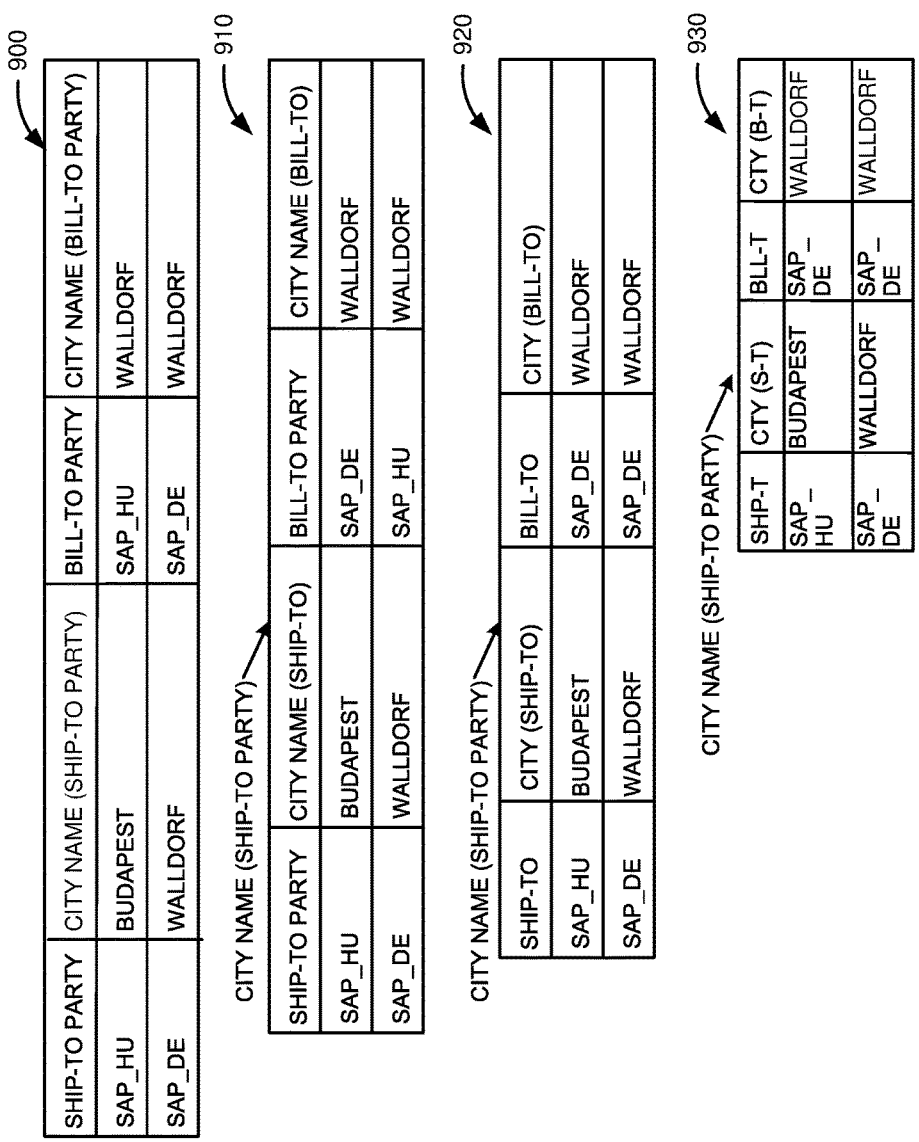
FIG. 9 is block diagram illustrating examples of UI views generated with different display properties defined for presenting the UI views based on provided adaptive label texts, according to some embodiments.

FIG. 9 is block diagram illustrating examples of UI views generated with different display properties defined for presenting the UI views based on provided adaptive label texts, according to some embodiments. FIG. 9 includes 4 UI views with different display properties, namely, view 900, view 910, view 920, and view 930. Different column sizing is applied for the UI views 900, 910, 920, and 930. The UI views 900, 910, 920, and 930 are exemplary views rendered on a UI application in relation to presenting Table 760, discussed in FIG. 7.

and "City Name (Bill-To Party)" respectively. Note that in all cases the fully qualifying label text is preserved as a tooltip.

Figure 10:
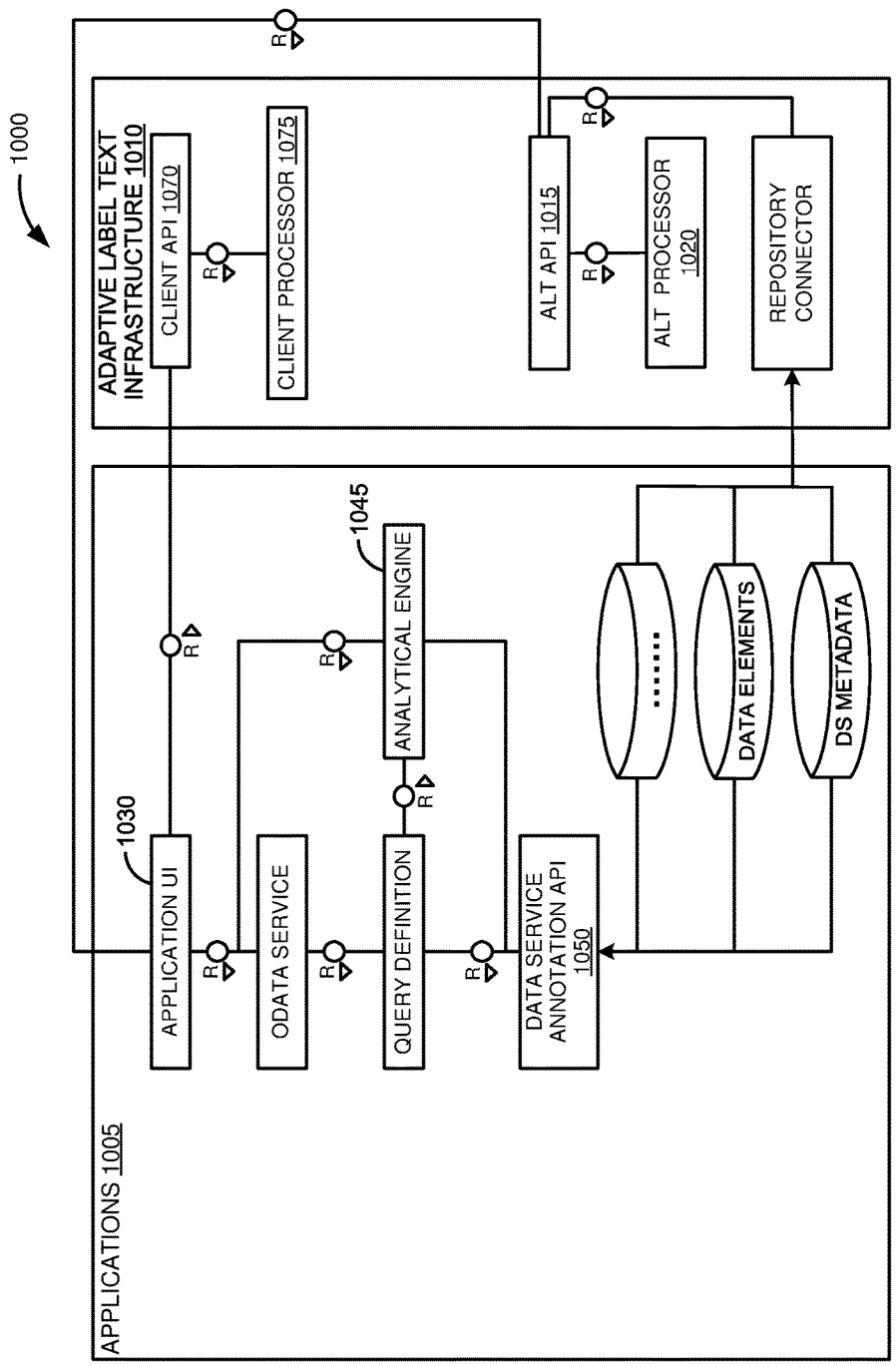
FIG. 10 is a block diagram illustrating an exemplary system for providing adaptive label texts for UI rendering based on a communication between a UI application and a client interface associated with adaptive label text constructions, according to one embodiment.

FIG. 10 is a block diagram illustrating an exemplary system 1000 for providing adaptive label texts for UI rendering based on a communication between a UI application and a client interface associated with ALT constructions, according to one embodiment. In one embodiment, the exemplary system 1000 includes applications 1005 environment, which may correspond to the described application 105 in relation to FIG. 1. An Application UI 1030 may be provided to include visualization of data in different form, and with different labeling, based on configurations and data associated with the application UI 1030. The Application 1005 may be coupled with an ALT infrastructure 1010, which provides ALT logic for providing enriched label text options to be used when rendering UI views, as discussed above. A UI view presented on the application UI 1030 may be such as the discussed views to be presented as part of an application UI with regards to FIGS. 1, 2, 3, 4, 5, 6, 7, 8, and 9. The application UI 1030 communicates with an analytical engine 1045 when executing actions associated with extracting data through a DS annotation API 1050 to define UI labeling. The DS annotation API 1050 may be such as the DS annotation API 150 and may communicate with an ALT API 1015, as discussed in details in relation to FIG. 1. Therefore, through the DS annotation API 1050 a back-end communication for determining adaptive label texts for rendering may be performed, where ALT logic implemented at the ALT processor 1020 is accessed.

In one embodiment, the ALT logic may be provided through the ALT infrastructure 1010 may be accessible on UI level. Before rendering a UI page and/or view, a view controller component of the Application UI, may invoke an ALT Client API 1070 for adapting the texts to be rendering accordingly. Within such a call, the view controller passes all relevant label texts with their hierarchical relationships, defined abbreviation strategies, abbreviation rules, maximum available spaces, font definitions etc.

In one embodiment, the client API 1070 provides an easy integration of the ALT functionality provided by the ALT infrastructure 1010 into the rendering logic of the application UI 1030, without the need to trigger backend calls, thus supporting an efficient responsive UI design. The client API 1070 may be suitable for a set of UI technologies, and when the client API is not available for a received request, a back-end ALT API 1015 may be called instead.

The Client API 1070 is in communication with a Client Processor 1075, which encapsulates the same abbreviation handling logic as the ALT backend processor 1020.

In one embodiment, fully qualifying label texts may be transmitted via metadata of the OData service at a view controller of the Application UI 1030. The DS annotation API 1050 may communicate with the ALT API 1050 to receive information about available active annotations derived for the view to be presented. However, the Application UI 1030 can additionally request abbreviation rules to be transferred in an extended OData service metadata document by adding a dedicated query option (e.g. <ODataServiceName>/$metadata?sap-labelAbbreviationRule=true) to the OData metadata request. The extended OData metadata response may additionally contain the applicable abbreviation rules (sap:labelAbbrevationRule), for example, as illustrated in relation to FIG. 7 and the active annotation 725. The UI application 1030 may provide all the received information from the DS annotation API 1050 to the client API 1070 of the ALT infrastructure 1010 for retrieving the label text that fits to the current UI presentation. For this purpose it may pass all fields with the respective fully qualifying label texts, the label abbreviation rules, the available space information, font definitions etc. to the ALT client API 1070. The ALT client API 1070 passes this information to the ALT client processor 1075 component, which calculates the required space for each label abbreviation and determines the most suitable label texts based on the default strategy "Unique label texts". If a client processor 1075 does not include implemented logic and data to be able to calculate appropriate and best suitable labeling for the request, the client API 1070 may initiate a call to the ALT API 1015 and use ALT functionality provided by the ALT processor 1020.

When the best suitable set of labels are determined for a received request at the client API 1070, the result is provided to the view controller of the application UI 1030 and UI with the applied best suitable set of labels is presented.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 11:
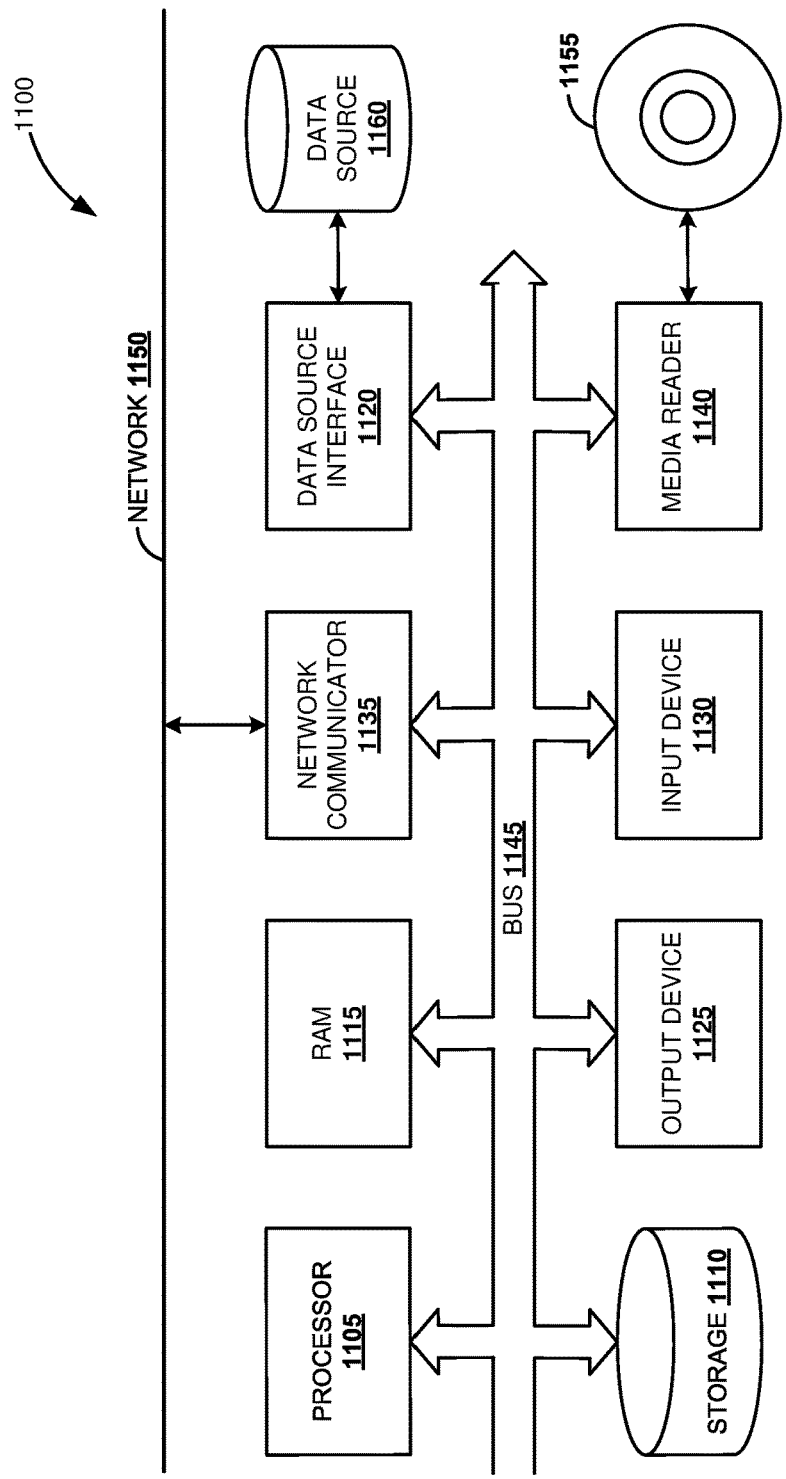
FIG. 11 is a block diagram illustrating an embodiment of a computing environment in which the techniques described for providing adaptive label texts for UI rendering can be implemented.

FIG. 11 is a block diagram of an exemplary computer system 1100. The computer system 1100 includes a processor 1105 that executes software instructions or code stored on a computer readable storage medium 1155 to perform the above-illustrated methods. The processor 1105 can include a plurality of cores. The computer system 1100 includes a media reader 1140 to read the instructions from the computer readable storage medium 1155 and store the instructions in storage X10 or in random access memory (RAM) 1115. The storage 1110 provides a large space for keeping static data where at least some instructions could be stored for later execution. According to some embodiments, such as some in-memory computing system embodiments, the RAM 1115 can have sufficient storage capacity to store much of the data required for processing in the RAM 1115 instead of in the storage 1110. In some embodiments, all of the data required for processing may be stored in the RAM 1115. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to enhance user interface (UI) labeling, the method comprising:
    receiving, through an interface, a request for enriching label texts of a view of a UI application;
    fetching data service metadata associated with the UI view, wherein the data service metadata includes a plurality of fields and association definitions in related to the UI view;
    determining label texts mapped to the plurality of fields, wherein one or more of the label texts are mapped to a field from the plurality of fields;
    constructing adaptive label texts for the plurality of fields based on evaluation of the association definitions and the determined label texts, wherein a set of adaptive label texts is associated with a field, and wherein each adaptive label text uniquely identifies a corresponding field from the plurality of fields;
    defining an enriched set of annotations based on the received request, wherein the enriched set of annotations includes the adaptive label texts and abbreviation rules for the adaptive label texts;
    at the interface, receiving data for a label handling strategy to be applied when determining the enriched set of annotations for the UI view, wherein the label handling strategy is received as an input parameter associated with the UI view;
    receiving data associated with a display rendering restriction defined for the UI view on the UI application; and
    providing best fitting label texts based on filtering the defined enriched set of annotations according to the received data for the label handling strategy and the display rendering restriction.

2. The method of claim 1, further comprising:
    instantiating the interface for accessing adaptive labeling logic for enriching label texts, wherein the adaptive labeling logic is provided at an adaptive labeling text processor.

3. The method of claim 1, wherein determining the label texts comprises:
    reading of one or more label texts mapped to a data element associated with a field from the plurality of fields, wherein the one or more label texts are read from a dictionary storage related to the UI application, and wherein the reading of the one or more label texts is performed through a repository connector associated with the interface.

4. The method of claim 1, wherein constructing the adaptive label texts for the plurality of fields comprises:
    converting a set of label texts associated with the field into alternative label texts, wherein converting includes:
    excluding duplicate label texts from the set of label texts;
    expanding abbreviated words part of the set of label texts based on a predefined abbreviation convention;
    removing a label text from the set of label strings, the label string comprising an unknown word; and
    preserving a label text from the label texts that is with a longest length.

5. The method of claim 1, wherein a text from the set of adaptive label texts includes a suffix indicating an originating association definition related to the field and the UI view.

6. The method of claim 1, further comprising:
defining abbreviation rules for the adaptive label texts constructed for the plurality of field, wherein an abbreviation rule defined for an adaptive label text defines a combination of one or more text strings part of the adaptive label text.

7. The method of claim 1, wherein the display rendering restriction includes maximum available space, text size, and text style.

8. The method of claim 1, wherein the label handling strategy is selection from a group consisting of a set of predefined label strategies and a set of combinations of strategies from the set of predefined label strategies.

9. A computer system for enhance user interface (UI) labeling, comprising:
at least one processor;
a memory in association with the at least one processor storing instructions related to:
receiving, through an interface, a request for enriching label texts of a view of a UI application;
at an adaptive labeling text processor associated with the interface:
fetching data service metadata associated with the UI view, wherein the data service metadata includes a plurality of fields and association definitions in relation to the UI view;
determining label texts mapped to the plurality of fields, wherein one or more of the label texts are mapped to a field from the plurality of fields;
constructing adaptive label texts for the plurality of fields based on evaluation of the association definitions and the determined label texts, wherein each adaptive label text uniquely identifies a corresponding field from the plurality of fields, wherein a set of adaptive label texts is associated with a field, and wherein a text from the set of adaptive label texts includes a suffix indicating an originating association definition related to the field and the UI view;
defining an enriched set of annotations based on the received request, wherein the enriched set of annotations includes the adaptive label texts and abbreviation rules associated with the adaptive label texts;
receiving, at the interface, data for a label handling strategy to be applied when determining the enriched set of annotations for the UI view, wherein the label handling strategy is received as an input parameter associated with the UI view;
receiving data associated with a display rendering restriction defined for the UI view on the UI application; and
providing best fitting label texts based on filtering the defined enriched set of annotations according to the received data for the label handling strategy and the display rendering restriction.

10. The system of claim 9, wherein the instructions to determine label texts further comprises instructions related to:
reading of one or more label texts mapped to a data element associated with a field from the plurality of fields, wherein the one or more label texts are read from a dictionary storage related to the UI application, and wherein the reading of the one or more label texts is performed through a repository connector associated with the interface.

11. The system of claim 9, wherein the instructions to construct the adaptive label texts for the plurality of fields further comprises instructions related to:
converting a set of label texts associated with the field into alternative label texts, wherein converting includes:
excluding duplicate label texts from the set of label texts;
expanding abbreviated words part of the set of label texts based on a predefined abbreviation convention;
removing a label text from the set of label strings, the label string comprising an unknown word; and
preserving a label text from the label texts that is with a longest length.

12. The system of claim 9, further comprising instructions to:
define abbreviation rules for the adaptive label texts constructed for the plurality of field, wherein an abbreviation rule defined for an adaptive label text defines a combination of one or more text strings part of the adaptive label text.

13. A non-transitory computer-readable medium storing instructions, which when executed cause a computer system to:
instantiate an interface for accessing adaptive labeling logic for enriching label texts provided at an adaptive labeling text processor;
receive, through the interface, a request for enriching label texts of a view of a UI application;
fetch data service metadata associated with the UI view, wherein the data service metadata includes a plurality of fields and association definitions in relation to the UI view;
determine label texts mapped to the plurality of fields, wherein one or more of the label texts are mapped to a field from the plurality of fields;
construct adaptive label texts for the plurality of fields based on evaluation of the association definitions and the determined label texts, wherein an adaptive label text uniquely identifies a corresponding field from the plurality of fields, wherein a set of adaptive label texts is associated with a field, and wherein a text from the set of adaptive label texts includes a suffix indicating an originating association definition related to the field and the UI view;
define abbreviation rules for the adaptive label texts constructed for the plurality of fields, wherein an abbreviation rule defined for an adaptive label text defines a combination of one or more text strings as part of the adaptive label text;
define an enriched set of annotations based on the received request, wherein the enriched set of annotations includes the adaptive label texts and the abbreviation rules;
at the interface, receive data for a label handling strategy to be applied when determining the enriched set of annotations for the UI view, wherein the label handling strategy is received as an input parameter associated with the UI view;
receive data associated with a display rendering restriction defined for the UI view on the UI application; and
provide best fitting label texts based on filtering the defined enriched set of annotations according to the received data for the label handling strategy and the display rendering restriction.

14. The computer-readable medium of claim 13, wherein the instructions to determine label texts further comprises instructions related to:

reading of one or more label texts mapped to a data element associated with a field from the plurality of fields, wherein the one or more label texts are read from a dictionary storage related to the UI application, and wherein the reading of the one or more label texts is performed through a repository connector associated with the interface.

15. The system of claim 13, wherein the instructions to construct the adaptive label texts for the plurality of fields further comprises instructions related to:
converting a set of label texts associated with the field into alternative label texts, wherein converting includes:
excluding duplicate label texts from the set of label texts;
expanding abbreviated words part of the set of label texts based on a predefined abbreviation convention;
removing a label text from the set of label strings, the label string comprising an unknown word; and
preserving a label text from the label texts that is with a longest length.

* * * * *